(12) United States Patent
Simonin et al.

(10) Patent No.: US 12,449,299 B2
(45) Date of Patent: Oct. 21, 2025

(54) ULTRAVIOLET RADIOMETER

(71) Applicant: Dymax Corporation, Torrington, CT (US)

(72) Inventors: Stephen P. Simonin, Northfield, CT (US); Walter Lin, Piscataway, NJ (US); William Anderson, Naugatuck, CT (US); David Barkus, Oakville, CT (US)

(73) Assignee: Dymax Corporation, Torrington, CT (US)

( * ) Notice: Subject to any disclaimer, the term of this patent is extended or adjusted under 35 U.S.C. 154(b) by 233 days.

(21) Appl. No.: 18/353,225

(22) Filed: Jul. 17, 2023

(65) Prior Publication Data
US 2024/0019299 A1    Jan. 18, 2024

Related U.S. Application Data (60) Provisional application No. 63/389,622, filed on Jul. 15, 2022.

(51) Int. Cl.
*G01J 1/44* (2006.01)
*G01J 1/04* (2006.01)
*G01J 1/42* (2006.01)

(52) U.S. Cl.
CPC ............. *G01J 1/429* (2013.01); *G01J 1/0414* (2013.01); *G01J 1/44* (2013.01); *G01J 2001/444* (2013.01)

(58) Field of Classification Search
CPC .. G01J 1/429; G01J 1/0414; G01J 1/44; G01J 2001/444; G01J 1/0219
See application file for complete search history.

(56) References Cited

U.S. PATENT DOCUMENTS

| 7,221,550 B2 | 5/2007 | Chang et al. |
| 2001/0045510 A1* | 11/2001 | Ganghofer ............. G01S 7/497 250/214 R |
| 2004/0021087 A1* | 2/2004 | Tokhtuev ............... G01J 1/429 359/361 |
| 2007/0053039 A1 | 3/2007 | Andreasch |

(Continued)

FOREIGN PATENT DOCUMENTS

CN    103278237 B    3/2015

OTHER PUBLICATIONS

Internation Search Report and Written Opinion for International Application No. PCT/US23/27894; International Filing Date: Jul. 17, 2023: Date of Mailing: Nov. 2, 23; 13 pages.

*Primary Examiner* — David P Porta
*Assistant Examiner* — Mamadou Faye
(74) *Attorney, Agent, or Firm* — Robinson & Cole LLP (57) ABSTRACT

According to an aspect, a UV radiometer is provided. The UV radiometer includes a sensor assembly and a sensor controller. The sensor assembly includes a UV sensor element and a temperature sensing component configured to perform a thermal adjustment of a sensed UV input from the UV sensor element to produce a compensated UV signal. The sensor controller includes a signal conditioning circuit configured to receive the compensated UV signal from the sensor assembly and produce a conditioned and compensated UV signal. The sensor controller also includes a communication interface configured to transmit the conditioned and compensated UV signal to a UV process controller.

20 Claims, 8 Drawing Sheets

(56) References Cited

U.S. PATENT DOCUMENTS

| | | | |
|---|---|---|---|
| 2008/0013598 A1* | 1/2008 | Perotti | G01K 7/026 |
| | | | 374/E7.007 |
| 2010/0104170 A1* | 4/2010 | Joshi | G07D 7/1205 |
| | | | 348/61 |
| 2010/0193259 A1* | 8/2010 | Wassvik | G06F 3/0423 |
| | | | 178/18.09 |
| 2014/0145860 A1* | 5/2014 | Park | H04Q 9/00 |
| | | | 340/870.01 |
| 2016/0242254 A1* | 8/2016 | Baccarin | B60Q 1/0094 |
| 2019/0181954 A1* | 6/2019 | Kawase | H01S 5/02325 |
| 2020/0078116 A1 | 3/2020 | Oberkircher et al. | |
| 2022/0065695 A1* | 3/2022 | Siess | G01J 3/28 |
| 2022/0355336 A1* | 11/2022 | Meisriemel | B05D 3/067 |

\* cited by examiner

ULTRAVIOLET RADIOMETER

CROSS-REFERENCE TO RELATED APPLICATION

This application claims the benefit of U.S. Provisional Application No. 63/389,622, filed Jul. 15, 2022, and entitled "Ultraviolet Radiometer", the content of which is incorporated herein by reference in its entirety.

BACKGROUND

The present disclosure relates generally to sensor systems, and more specifically to an ultraviolet radiometer.

Ultraviolet (UV) light can be used in a variety of applications, such as industrial processes, as well as medical and dental practices. For instance, UV light may be used for curing resins and inks, disinfecting surfaces and fluids, erasing memory contents in UV-erasable programmable read-only memory, and other such applications. For some applications, UV light must be closely controlled to produce highly consistent and repeatable results. As a UV light source ages, the output intensity can change. Thus, in tightly-controlled processes that use UV light, accurate monitoring of UV intensity over a period of time can be critical.

BRIEF SUMMARY

According to some embodiments, a UV radiometer is provided. The UV radiometer includes a sensor assembly and a sensor controller. The sensor assembly includes a UV sensor element and a temperature sensing component configured to perform a thermal adjustment of a sensed UV input from the UV sensor element to produce a compensated UV signal. The sensor controller includes a signal conditioning circuit configured to receive the compensated UV signal from the sensor assembly and produce a conditioned and compensated UV signal. The sensor controller also includes a communication interface configured to transmit the conditioned and compensated UV signal to a UV process controller.

In addition to one or more of the features described above or below, or as an alternative, embodiments may include where the sensor assembly includes a printed circuit board (PCB) having the UV sensor element on a first side of the PCB and an amplifier on a second side of the PCB, and where the temperature sensing component is in a feedback configuration with the amplifier to provide a temperature compensated gain to the compensated UV signal.

In addition to one or more of the features described above or below, or as an alternative, embodiments may include where the sensor controller includes a signal level validation circuit configured to perform a comparison to detect whether the compensated UV signal is above a lower threshold level and below an upper threshold level, and output a UV signal validation indicator based on a result of the comparison.

In addition to one or more of the features described above or below, or as an alternative, embodiments may include where the sensor controller includes a local power supply configured to receive power from the UV process controller and provide an isolated power supply to the sensor assembly.

In addition to one or more of the features described above or below, or as an alternative, embodiments may include where the signal conditioning circuit includes a voltage spike suppressor.

In addition to one or more of the features described above or below, or as an alternative, embodiments may include where the communication interface includes an analog-to-digital converter and a communication encoder/decoder configured to communicate with the UV process controller.

In addition to one or more of the features described above or below, or as an alternative, embodiments may include a reflector configured to reflect a portion of emitted UV light toward a UV light input port of the sensor assembly proximate to the UV sensor element.

According to an aspect, a UV system includes a UV light source, a UV process controller configured to control the UV light source, and a UV radiometer interfaced with the UV process controller. The UV radiometer includes a sensor assembly with a UV sensor element and a temperature sensing component configured to perform a thermal adjustment of a sensed UV input from the UV sensor element to produce a compensated UV signal. The sensor assembly can also include a sensor controller with a signal conditioning circuit configured to receive the compensated UV signal from the sensor assembly and produce a conditioned and compensated UV signal. The sensor controller also includes a communication interface configured to transmit the conditioned and compensated UV signal to the UV process controller.

In addition to one or more of the features described above or below, or as an alternative, embodiments may include where the sensor assembly includes a PCB having the UV sensor element and an amplifier on the PCB, and where the temperature sensing component is in a feedback configuration with the amplifier to provide a temperature compensated gain to the compensated UV signal.

In addition to one or more of the features described above or below, or as an alternative, embodiments may include where the sensor controller includes a signal level validation circuit configured to perform a comparison to detect whether the compensated UV signal is above a lower threshold level and below an upper threshold level, and output a UV signal validation indicator based on a result of the comparison.

In addition to one or more of the features described above or below, or as an alternative, embodiments may include where the sensor controller includes a local power supply configured to receive power from the UV process controller and provide an isolated power supply to the sensor assembly.

In addition to one or more of the features described above or below, or as an alternative, embodiments may include a UV illumination area, where the UV process controller is configured to control exposure of one or more workpieces to UV light emitted by the UV light source in the UV illumination area based on the conditioned and compensated UV signal received from the UV radiometer.

In addition to one or more of the features described above or below, or as an alternative, embodiments may include where the UV radiometer includes a reflector configured to swivel about a UV light input port of the sensor assembly proximate to the UV sensor element, and the reflector is adjustable to direct a portion of UV light emitted from the UV light source into the UV light input port.

According to an aspect, a method of detecting UV light by a UV radiometer includes receiving UV light as a sensed UV input at a sensor element of a sensor assembly of the UV radiometer, performing a thermal adjustment of the sensed UV input to compensate for a temperature at the sensor element and produce a compensated UV signal, outputting the compensated UV signal to a sensor controller of the UV radiometer, performing signal conditioning of the compensated UV signal at the sensor controller to produce a conditioned and compensated UV signal, and transmitting the conditioned and compensated UV signal from the sensor controller to a UV process controller.

In addition to one or more of the features described above or below, or as an alternative, embodiments may include where the sensor assembly includes a PCB having the UV sensor element on a first side of the PCB and an amplifier on a second side of the PCB, and the method further includes providing a temperature compensated gain to the compensated UV signal based on a temperature sensing component in a feedback configuration with the amplifier.

In addition to one or more of the features described above or below, or as an alternative, embodiments may include performing a comparison to detect whether the compensated UV signal is above a lower threshold level and below an upper threshold level, and outputting a UV signal validation indicator based on a result of the comparison.

In addition to one or more of the features described above or below, or as an alternative, embodiments may include receiving power from the UV process controller at the sensor controller, and providing an isolated power supply from the sensor controller to the sensor assembly.

In addition to one or more of the features described above or below, or as an alternative, embodiments may include performing an analog-to-digital conversion at the sensor controller, and using a communication encoder/decoder of the sensor controller to communicate with the UV process controller.

In addition to one or more of the features described above or below, or as an alternative, embodiments may include capturing UV light directed by a reflector at a UV light input port of the sensor assembly proximate to the UV sensor element.

In addition to one or more of the features described above or below, or as an alternative, embodiments may include controlling, by the UV process controller, exposure of one or more workpieces to UV light emitted by a UV light source in a UV illumination area based on the conditioned and compensated UV signal received from the UV radiometer.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

According to embodiments disclosed herein, an ultraviolet (UV) radiometer is provided that can be incorporated in a UV system. A UV radiometer can be used to monitor UV light sources and processes that use UV light. In some UV light sensing applications, photodetectors may be used which respond to a wide range of light source wavelengths, such as the visual range and infrared range. Such wideband sensors may be effective where other light sources are not present or where UV light intensity detection accuracy need not be precise. Further, some UV light sensing applications may work well for intermittent UV light sensing but may not be practical for long-term or continuous monitoring of UV light. Embodiments as disclosed herein can support a variety of monitoring conditions, including conditions with multiple sources of light other than UV light, and can be mounted in various positions, such as perpendicular to a beam of UV light. Embodiments can include a modularized structure where a sensor assembly including a UV sensor element is separately packaged from a sensor controller to support placement flexibility. Alternate packaging can include combining the sensor assembly and the sensor controller in a shared housing to reduce the distance between the sensor assembly and the sensor controller while having a compact total package size.

Figure 1:
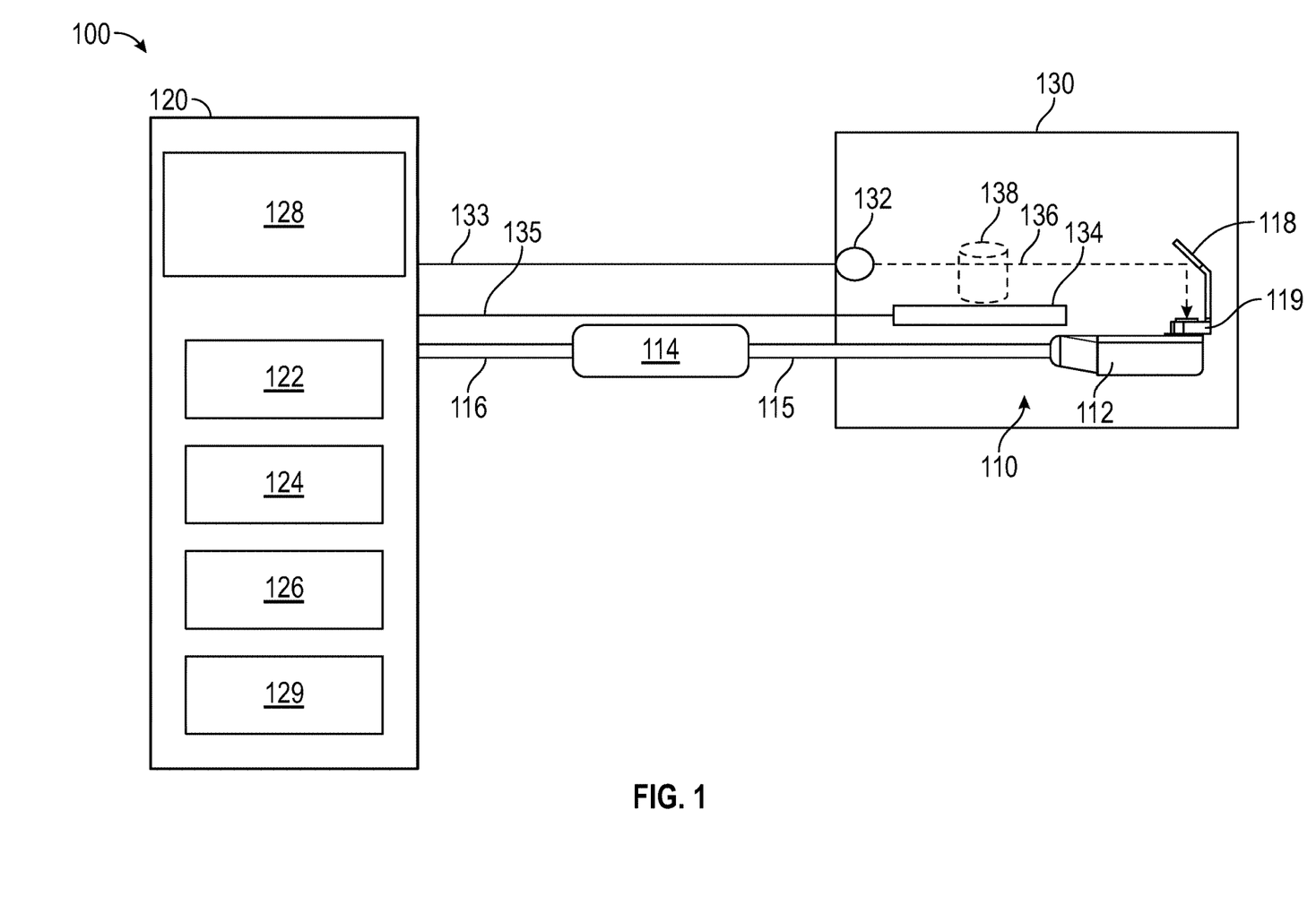
FIG. 1 depicts a block diagram of a UV system according to some embodiments of the present invention.

Turning now to FIG. 1, a UV system 100 is depicted according to some embodiments. The UV system 100 includes a UV radiometer 110 configured to communicate with a UV process controller 120. The UV system 100 also includes a UV illumination area 130 with a UV light source 132. The UV illumination area 130 can include one or more actuation systems 134 that may be controlled by the UV process controller 120 through an actuator control link 135. The UV process controller 120 may also control the UV light source 132 through a source control link 133. UV light 136 emitted by the UV light source 132 can be used to provide a controlled UV exposure to one or more workpieces 138 in the UV illumination area 130. For example, the one or more workpieces 138 may include a UV-sensitive resin that is cured by exposure to the UV light 136. The one or more actuation systems 134 can control positioning of the one or more workpieces 138 relative to the UV light 136 emitted by the UV light source 132. For example, the one or more actuation systems 134 can include a conveyor belt, a turntable, a multi-axis positioning system, robotic components, and/or other such effectors, which may move the one or more workpieces 138 into and/or out of the UV illumination area 130 as part of an automated manufacturing or processing line. As further examples, the UV light source 132 can be controlled relative to the one or more workpieces 138 to perform UV-based sterilization, erasing of UV-erasable programmable read-only memory, curing ink, and/or other such applications.

Figure 2:
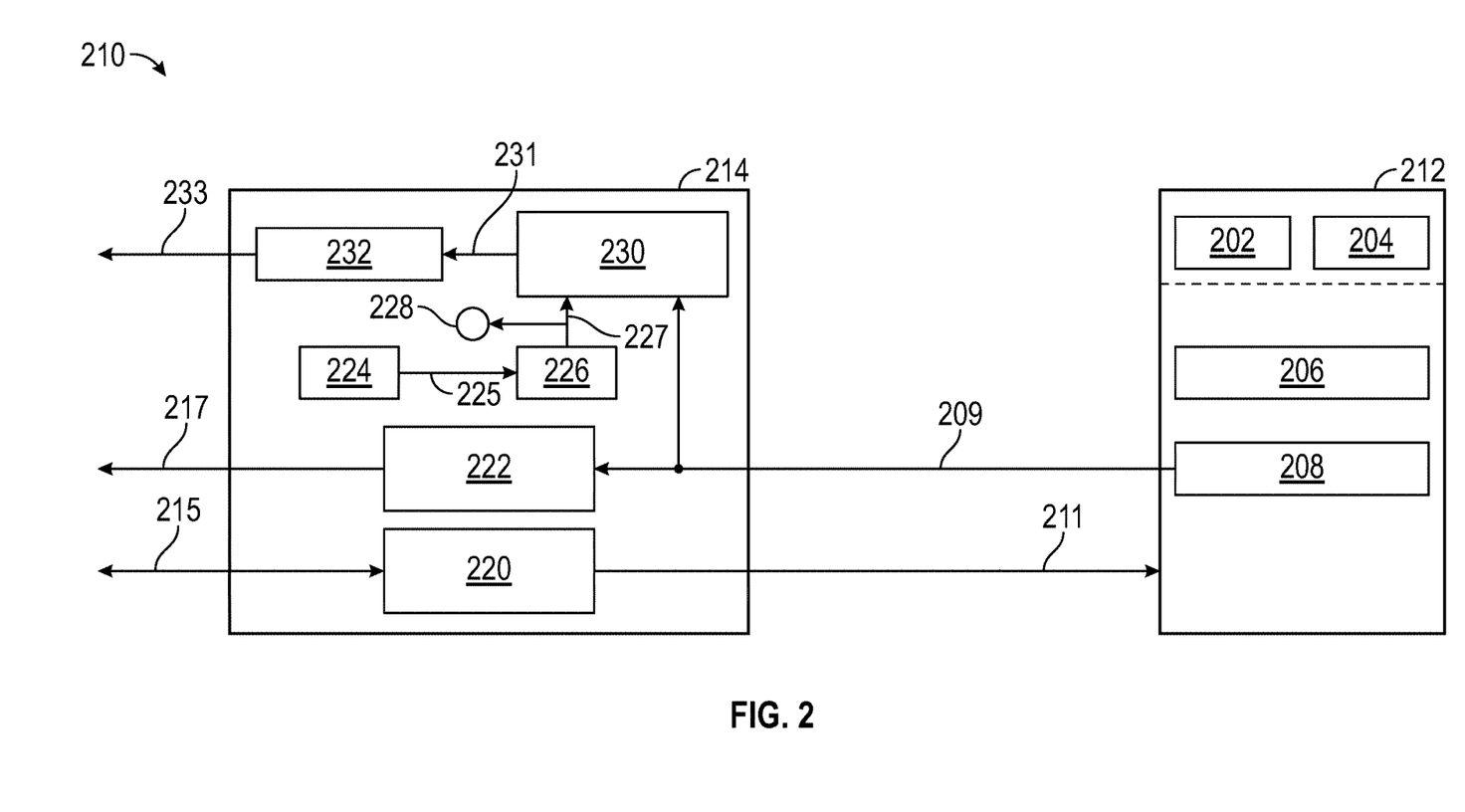
FIG. 2 depicts a block diagram of a UV radiometer according to some embodiments of the present invention.

To monitor the intensity of the UV light 136 and track exposure time of the one or more workpieces 138 to the UV light 136, the UV radiometer 110 can be interfaced with the UV process controller 120. As depicted in the example of FIG. 1, the UV radiometer 110 can include a sensor assembly 112 and a sensor controller 114. A sensor link 115 between the sensor assembly 112 and the sensor controller 114 can allow the sensor assembly 112 to be positioned within or in close physical proximity to the UV illumination area 130 while the sensor controller 114 is positioned external to or physically remote from the UV illumination area 130. As one example, the UV illumination area 130 can be within an enclosure, where the sensor assembly 112 is within the enclosure and the sensor controller 114 is external to the enclosure. A controller link 116 can establish communication between the sensor controller 114 and the UV process controller 120. The UV radiometer 110 can also include a reflector 118 configured to swivel about a UV light input port 119 of the sensor assembly 112 proximate to a UV sensor element 202 (FIG. 2). The reflector 118 can reduce the amount of direct exposure of the UV sensor element 202 to the UV light 136 and support multiple positioning options as both the sensor assembly 112 and the reflector 118 can be repositioned within the UV illumination area 130. In applications where the intensity of the UV light 136 is below an upper exposure threshold of the UV sensor element 202, the reflector 118 can be omitted, and the UV sensor element 202 can be positioned to receive the UV light 136 directly. Further, filter or lens elements may be positioned between the UV sensor element 202 and UV light source 132 in some embodiments. In some embodiments, the reflector 118 can be a fixed component that does not swivel relative to the UV light input port 119.

The UV process controller 120 can include a processing device 122, a memory device 124, an input/output interface 126, a user interface 128, and may also include a network interface 129. The UV process controller 120 can be a programmable logic controller and use combination of off-the-shelf components and software blended with customized components and software. The processing device 122 can include a hardware device for executing software, such as software stored in memory device 124. The processing device 122 may be any custom made or commercially available computer processor, a central processing unit (CPU), a digital signal processor (DSP), a microcontroller, a programmable gate array, an auxiliary processor among several processors, a semiconductor-based microprocessor (in the form of a microchip or chip set), a macro-processor, or generally any device for executing instructions.

The memory device 124 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 124 may incorporate electronic, magnetic, optical, and/or other types of storage media. Accordingly, the memory device 124 is an example of a tangible computer readable storage medium upon which instructions executable by the processing device 122 may be embodied as a computer program product. The memory device 124 can have a distributed architecture, where various components are situated remotely from one another, but can be accessed by one or more instances of the processing device 122.

The instructions in memory device 124 may include one or more separate programs, each of which comprises an ordered listing of executable instructions for implementing logical functions. In the example of FIG. 1, the instructions in the memory device 124 can include a suitable operating system (O/S) and program instructions. The O/S essentially controls the execution of programs and provides scheduling, input-output control, file and data management, memory management, and communication control and related services. When in operation, the processing device 122 is configured to execute instructions stored within the memory device 124, to communicate data to and from the memory device 124, and to generally control operations of the UV process controller 120 pursuant to the instructions.

The input/output interface 126 may include, for example, one or more buses or other wired or wireless connections, as known in the art. The input/output interface 126 may have additional elements, which are omitted for simplicity, such as controllers, analog-to-digital converters, digital-to-analog converters, filters, clocks, buffers (caches), drivers, repeaters, and receivers, to enable communications. For example, the controller link 116, source control link 133, and/or actuator control link 135 can establish communication and/or power transfer between the input/output interface 126 and the sensor controller 114, the UV light source 132, and/or the one or more actuation systems 134 respectively. Signals can be analog or digitally encoded and may include clocks, power, ground, and the like in unidirectional or bidirectional paths.

The user interface 128 can include a display and input elements, such as a touch-sensitive screen, buttons, dials, switches, a keyboard, a mouse, and/or other such user interface elements known in the art. Further, the user interface 128 can include audio and/or video capabilities.

The network interface 129 can establish communication channels with one or more other computer systems via one or more network links. The network interface 129 can support wired and/or wireless communication protocols known in the art. For example, the network interface 129 can support data transfer with remote computer systems and/or local computing devices, such as a server, a laptop computer, a workstation, a desktop computer, a tablet computer, a mobile device (e.g., a smart phone), and/or other such computer device known in the art. Further, the network interface 129 can support connections with multiple instances of the UV process controller 120 and/or other control systems as part of a larger-scale manufacturing process.

Although only a single instance of the UV radiometer 110 and UV light source 132 are depicted in the example of FIG. 1, it will be understood that the UV process controller 120 can interface with multiple instances of the UV radiometer 110 and/or UV light source 132. Further, other interface elements, such as routers, switches, drivers, and buffers can be interposed between the UV process controller 120 and other components depicted in FIG. 1. Additionally, components of the UV system 100 can be combined or further subdivided in embodiments.

FIG. 2 depicts a block diagram of a UV radiometer 210 according to some embodiments. The UV radiometer 210 is an example of the UV radiometer 110 of FIG. 1. The UV radiometer 210 includes a sensor assembly 212 and a sensor controller 214. The sensor assembly 212 is an example of the sensor assembly 112 of FIG. 1, and the sensor controller 214 is an example of the sensor controller 114 of FIG. 1. In the example of FIG. 2, the sensor assembly 212 includes a UV sensor element 202, a temperature sensing component 204, a signal filter 206, and an amplifier 208. The sensor assembly 212 can be partitioned into multiple sections. For example, the sensor assembly 212 can include a printed circuit board (PCB) having the UV sensor element 202 on a first side (e.g., top) of the PCB and the amplifier 208 on a second side (e.g., bottom) of the PCB. The temperature sensing component 204 can also be on the first side of the PCB, and the signal filter 206 can be on the second side of the PCB. Arranging the amplifier 208 below the UV sensor element 202 can result in reduced signal noise and drift with shorter physical connections. The signal filter 206 can filter out noise sources and attenuate out-of-band signals.

Figure 4:
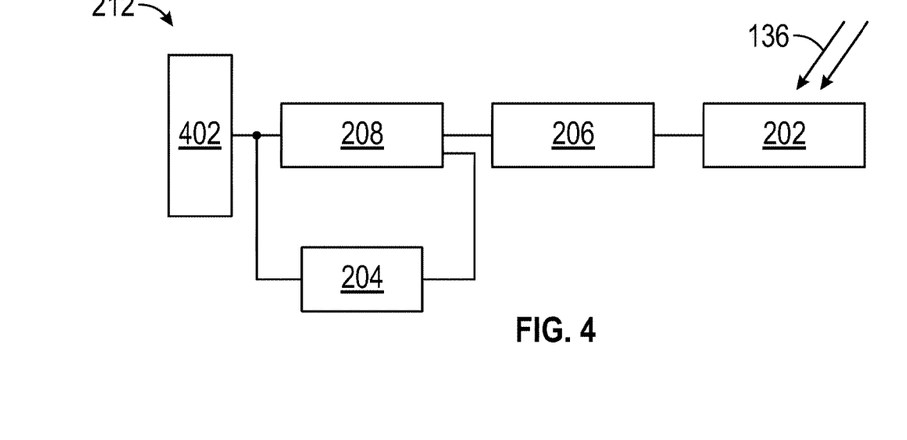
FIG. 4 depicts a block diagram of a sensor assembly of a UV radiometer according to some embodiments of the present invention.
Figure 5:
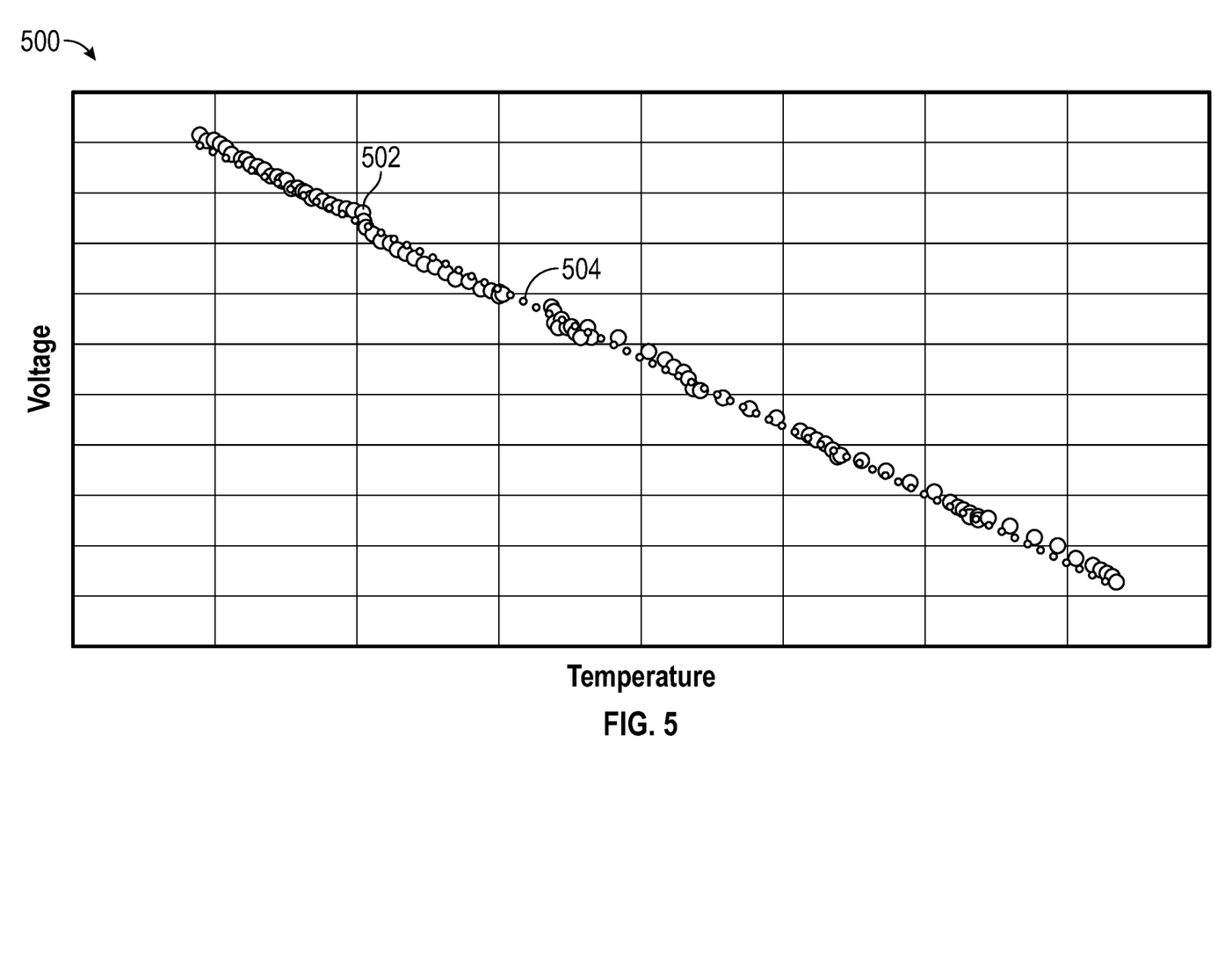
FIG. 5 depicts a plot of a UV sensor element response according to some embodiments of the present invention.

The UV sensor element 202 can be selected as a highly-tuned component that responds to UV light having a wavelength of about 200 nm to about 405 nm while producing minimal output at other wavelengths. In an embodiment, the UV sensor element 202 can have an analog output of about 0 to 400 mV. The output response of the UV sensor element 202 may change over a range of temperatures. See, for example, FIG. 5, where chart 500 illustrates that observation of multiple datasets 502, 504 from associated tests of the UV sensor element 202 have a substantially linear change in voltage output as temperature increases over a range of temperatures. In embodiments, this temperature sensitive offset can be counterbalanced by performing a thermal adjustment based on the temperature sensing component 204. As one example, the temperature sensing component 204 can be in a feedback configuration with the amplifier 208 to provide a temperature compensated gain to the compensated UV signal, as depicted in the example of FIG. 4, which illustrates the UV sensor element 202 passing a sensed UV input through signal filter 206 to amplifier 208. The amplifier 208 can apply a gain to the sensed UV input, and the effect of the temperature sensing component 204 can accommodate the temperature effects with the resulting temperature adjusted signal output of the amplifier 208 passed to a connection interface 402 to pass a compensated UV signal 209 to the sensor controller 214 of FIG. 2. The temperature sensing component 204 can be selected as a component (e.g., a thermistor) that results in an increased gain as temperature increases to complement the reduced gain of the UV sensor element 202 as temperature increases. As one example, the net effect of the amplifier 208 and temperature sensing component 204 can provide a temperature adjusted gain of about 11. It will be understood that the example ranges and gain are provided for purposes of illustration and other ranges and gains can be supported in various embodiments.

With continued reference to FIG. 2, the sensor controller 214 can include a local power supply 220 configured to receive power 215 from the UV process controller 120 of FIG. 1 and provide an isolated power supply 211 to the sensor assembly 212. The power 215 provided by the UV process controller 120 may be at a higher voltage level, such as 12 Vdc or 24 Vdc, while the sensor assembly 212 may operate at a lower voltage level, such as about 4.5 to 5 Vdc. The local power supply 220 can be a linear supply that isolates the sensor assembly 212 from electromagnetic interference and voltage drops. The local power supply 220 may accept a wide range of input voltage, such as 6 Vdc to 100 Vdc for local regulation.

The sensor controller 214 can also include a signal conditioning circuit 222. The signal conditioning circuit 222 is configured to receive the compensated UV signal 209 from the sensor assembly 212 and produce a conditioned and compensated UV signal 217. The signal conditioning circuit 222 can include a voltage spike suppressor. For example, the voltage spike suppressor can be configured to range limit the conditioned and compensated UV signal 217, for instance, to a maximum of about 5.1 Vdc such that it is compatible with a processing input of the input/output interface 126 of FIG. 1. The input/output interface 126 can receive the conditioned and compensated UV signal 217 as an analog signal and perform analog-to-digital conversion for processing by the processing device 122 of FIG. 1.

The sensor controller 214 can also include a threshold voltage circuit 224 used to establish one or more reference voltages 225 for a signal level validation circuit 226. The signal level validation circuit 226 can perform a comparison of the compensated UV signal 209 relative to the one or more reference voltages 225. The signal level validation circuit 226 can include one or more comparator circuits and/or other logic gates and functions. As one example, the one or more reference voltages 225 can include a lower voltage threshold and an upper voltage threshold. The lower voltage threshold can be, for instance, between 10% and 30% of the maximum output of the compensated UV signal 209, such as about 20%. The upper voltage threshold can be, for instance, between 70% and 90% of the maximum output of the compensated UV signal 209, such as about 80%. Other values for the lower voltage threshold and the upper voltage threshold are contemplated. The combination of the threshold values may be centered at about 50% of the maximum output of the compensated UV signal 209. When the compensated UV signal 209 is in-range, i.e., between the lower voltage threshold and the upper voltage threshold, an in-range indicator 227 can be set to a voltage level, e.g., of about 5 Vdc to illuminate a valid indication 228, which may be a light emitting diode (LED) and can provide an input to an amplifier 230. The amplifier 230 can have a gain of about 1 and be used as a signal driver of a communication interface to pass an amplified version 231 of the in-range indicator 227 to a signal conditioner 232 and out of the sensor controller 214 as a UV signal validation indicator 233. The signal conditioner 232 can be a voltage spike suppressor to prevent voltage above about 5.1 Vdc from being driven to the input/output interface 126 of FIG. 1. Voltage spike suppression provided by the signal conditioner 232 and the signal conditioning circuit 222 can also protect the sensor controller 214 from damage if a higher voltage input is inadvertently applied to connectors for the conditioned and compensated UV signal 217 and/or the UV signal validation indicator 233.

The power 215, conditioned and compensated UV signal 217, and UV signal validation indicator 233 can collectively form connector lines of the controller link 116 of FIG. 1. The compensated UV signal 209 and the isolated power supply 211 can collectively form connector lines of the sensor link 115 of FIG. 1. In addition to the valid indication 228, the sensor controller 214 can include other visual indicators (e.g., LEDs) for other status information, such as whether the sensor controller 214 is powered. The use of visual indicators on the sensor controller 214 can be helpful where the sensor controller 214 is located external to the UV illumination area 130 of FIG. 1 while the sensor assembly 212 is positioned within the UV illumination area 130. The valid indication 228 can assist in confirming placement of the sensor assembly 212 and positioning of the reflector 118 of FIG. 1 relative to the UV light 136 to confirm that the UV sensor element 202 is positioned to detect the UV light 136 emitted by the UV light source 132 of FIG. 1 while also staying below a potential saturation limit of the UV sensor element 202.

Figure 3:
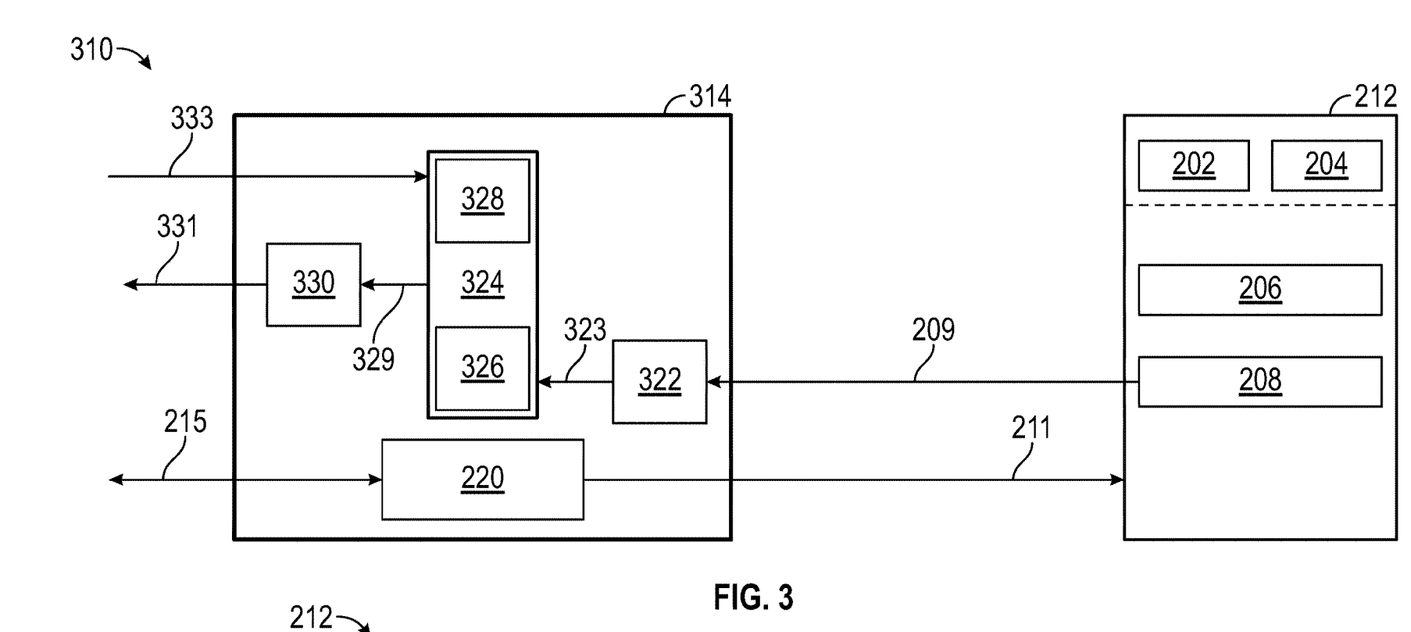
FIG. 3 depicts a block diagram of a UV radiometer according to some embodiments of the present invention.

FIG. 3 depicts a block diagram of a UV radiometer 310 according to some embodiments. The UV radiometer 310 is an example of the UV radiometer 110 of FIG. 1. The UV radiometer 310 includes the sensor assembly 212 of FIG. 2 and a sensor controller 314. The sensor controller 314 is another example of the sensor controller 114 of FIG. 1. As previously described with respect to the example of FIG. 2, the sensor assembly 212 includes a UV sensor element 202, a temperature sensing component 204, a signal filter 206, and an amplifier 208. The sensor assembly 212 receives an isolated power supply 211 from the sensor controller 314 and can output the compensated UV signal 209 to the sensor controller 314. In the example of FIG. 3, similar to the sensor controller 214 of FIG. 2, the sensor controller 314 can include local power supply 220 configured to receive power 215 from the UV process controller 120 of FIG. 1 and provide the isolated power supply 211 to the sensor assembly 212.

The sensor controller 314 also includes a signal conditioning circuit 322 configured to receive the compensated UV signal 209 from the sensor assembly 212 and produce a conditioned and compensated UV signal 323 as an analog signal. A communication interface 324 of the sensor controller 314 can include an analog-to-digital converter 326 and a communication encoder/decoder 328 configured to communicate with the UV process controller 120 of FIG. 1. The communication interface 324 can receive the conditioned and compensated UV signal 323 and use the analog-to-digital converter 326 to determine a digital representation of the conditioned and compensated UV signal 323. The communication encoder/decoder 328 can output an encoded (e.g., serialized) version of the conditioned and compensated UV signal 323 as communication output 329, which may pass through a signal conditioner 330 and out of the sensor controller 314 as a digitized, conditioned and compensated UV signal 331 to the input/output interface 126 of FIG. 1. The input/output interface 126 can also transmit an encoded (e.g., serialized) input stream 333 to the communication encoder/decoder 328. For example, the UV process controller 120 may transmit configuration commands, self-test commands, and other such commands and data to the communication interface 324 via the encoded input stream 333. The power 215, digitized, conditioned and compensated UV signal 331, and encoded input stream 333 can collectively form connector lines of the controller link 116 of FIG. 1. As one example, signals on lines 331 and 333 can be compliant with a standardized communication format, such as serial peripheral interface (SPI), RS-232, RS-422, RS-488, CAN-bus, or other such formats. In some embodiments, rather than using physical lines for communication, wireless links such as Wi-Fi, Bluetooth, or other such wireless communication can be used.

Figure 6:
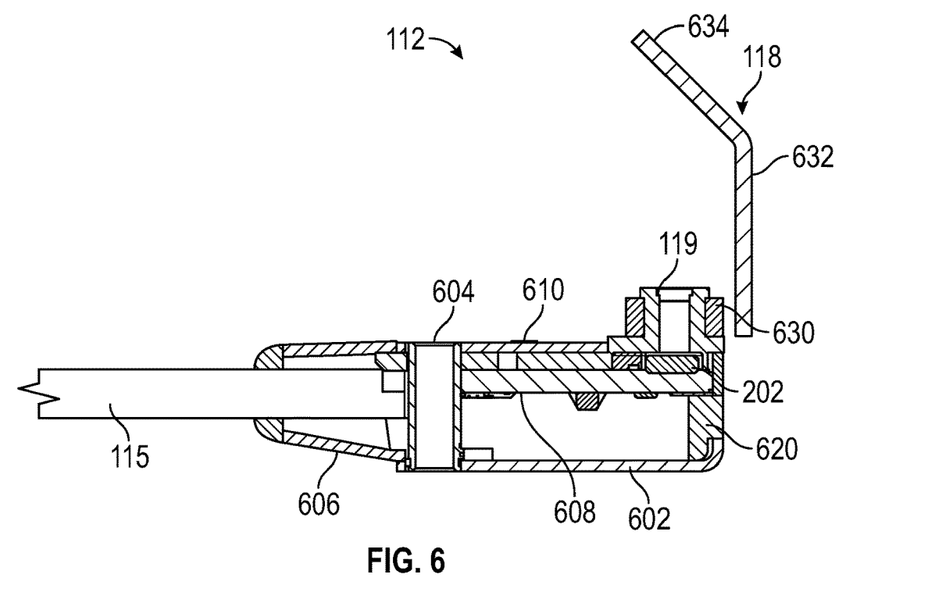
FIG. 6 depicts a sectional view of a sensor assembly of a UV radiometer according to some embodiments of the present invention.

Various packaging designs can be used in embodiments, for instance, depending upon size and placement constraints. As an example of components used to construct the sensor assembly 112 of FIG. 1, which may be used for the sensor assembly 212 of FIGS. 2 and 3, FIG. 6 depicts a sectional view of the sensor assembly 112 according to some embodiments. The components of the sensor assembly 112 are further depicted in FIG. 7 according to some embodiments. The sensor assembly 112 can include a bottom plate 602 with a coupler 604. The coupler 604 can be in the form of a tube that passes through a boot 606, a sensor circuit board 608, and a top plate 610. The hollow center of the tube shape of the coupler 604 can provide a mounting or alignment guide to assist in positioning and retaining the sensor assembly 112 when it is fully assembled. For example, a lower portion 612 of the boot 606 can include an alignment hole 613 and an upper portion 614 of the boot 606 can include an alignment hole 615 to mate with the coupler 604. Similarly, the sensor circuit board 608 can include an alignment hole 616, and the top plate 610 can include an alignment hole 618 to mate with the coupler 604. The boot 606 can be made of an elastomeric material to hold the sensor circuit board 608 in place and provide insulation to the sensor circuit board 608. The boot 606 can block the UV light 136 from entering the sensor assembly 112 at locations other than the UV light input port 119. Further, the boot 606 can provide cable strain relief for the sensor link 115. A connector 620 of the boot 606 can serve as a connection point through a hole 622 in a sidewall 624 of the bottom plate 602. The upper portion 614 of the boot 606 can include the UV light input port 119, which aligns with the UV sensor element 202 upon assembly. The top plate 610 can include a notch 626 configured to fit around the UV light input port 119.

Figure 7:
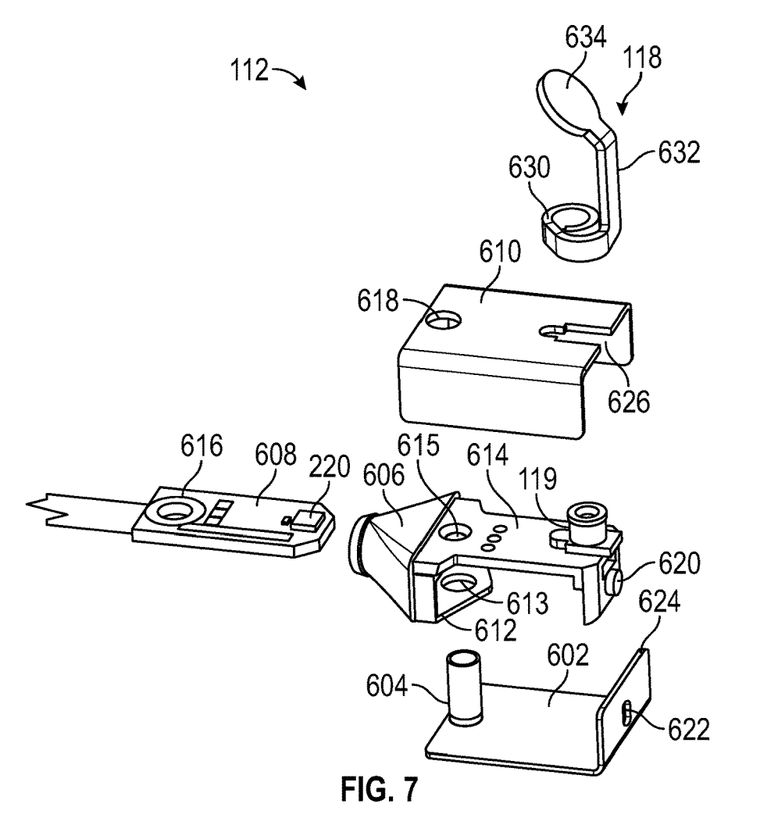
FIG. 7 depicts an exploded view of a sensor assembly of a UV radiometer according to some embodiments of the present invention.

The reflector 118 can be attached or detached as needed. The reflector 118 is configured to swivel about the UV light input port 119 of the sensor assembly 112 proximate to the UV sensor element 202. The reflector 118 can include a swivel base 630, a body 632, and a reflector head 634, where the body 632 extends from the swivel base 630 and the reflector head 634 projects from the body 632. As one example, the swivel base 630, body 632, and reflector head 634 are formed of a unitary material, such as stainless steel. The angle of the reflector head 634 relative to the upper surface of the top plate 610 may be about 45 degrees; however, the angle may be adjustable or have other values. The swivel base 630 is configured to be coupled to the UV light input port 119 to make a swivel attachment. The swivel base 630 can allow the reflector 118 to rotate 360 degrees and can be held in position by friction.

Figure 8:
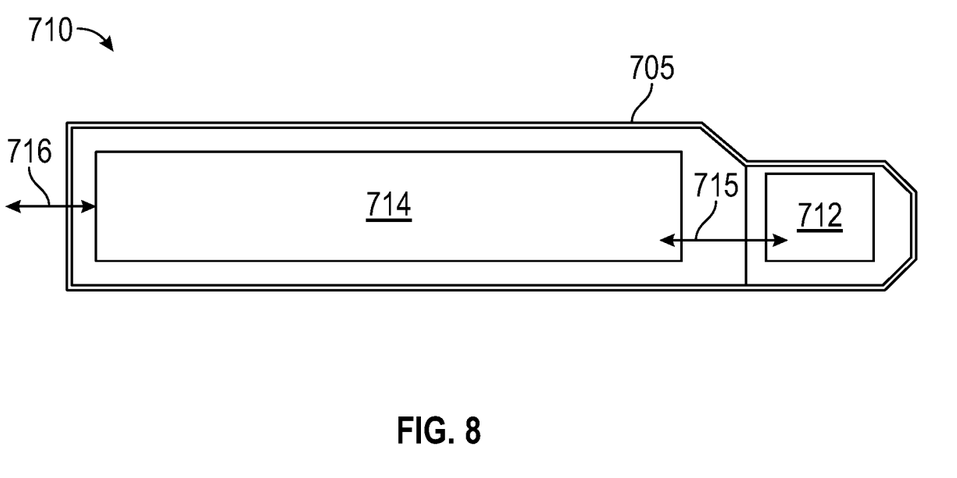
FIG. 8 depicts an example of a UV radiometer that combines a sensor assembly and a sensor controller in a common housing according to some embodiments of the present invention.

FIG. 8 depicts an example of a UV radiometer 710 that combines a sensor assembly 712 and a sensor controller 714 in a common housing 705 according to some embodiments. The sensor assembly 712 can include the components of the sensor assembly 212 of FIG. 2, and the sensor controller 714 can include the components of the sensor controller 214 or 314 of FIGS. 2 and 3. A sensor link 715, similar to the sensor link 115 of FIG. 1, can establish communication and transfer power between the sensor assembly 712 and the sensor controller 714. However, rather than using a bundle of wires, the sensor link 715 can be implemented as circuit board traces, jumpers, or short point-to-point connections. The short distance of connections of the sensor link 715 within the common housing 705 can remove the need for shielding that may otherwise be needed if the sensor assembly 712 and sensor controller 714 were in separate housings separated by a distance. The sensor assembly 712 and sensor controller 714 can be constructed on a shared circuit board or be two separate circuit boards in close physical proximity within the common housing 705. As one example, the common housing 705 may be about the size of a universal serial bus (USB)

memory stick/thumb drive. The sensor controller 714 can communicate with the UV process controller 120 of FIG. 1 through a controller link 716. The controller link 716 can be a wired or wireless connection. In some embodiments, such as where the controller link 716 is wireless, the sensor controller 714 may receive power from a source other than the UV process controller 120, such as battery power or other such source.

Figure 9:
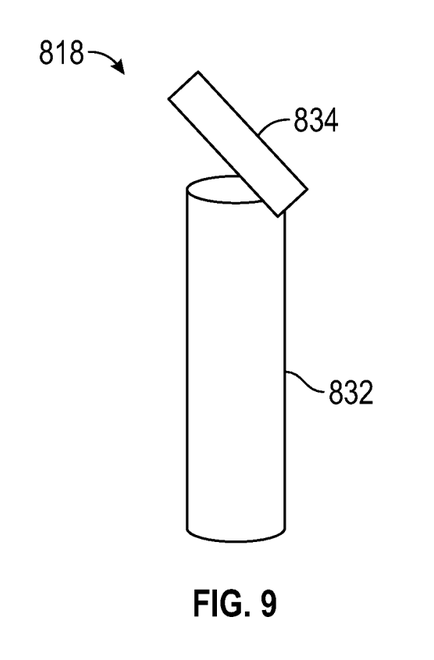
FIG. 9 depicts an example of a reflector for a sensor assembly of a UV radiometer according to some embodiments of the present invention.

FIG. 9 depicts an example of a reflector 818 for a sensor assembly of a UV radiometer according to some embodiments. The reflector 818 is an alternate embodiment of the reflector 118 of FIG. 1. In the example of FIG. 9, the reflector 818 includes a reflector body 832 and a reflector head 834. The reflector body 832 can be a tube, where a lower portion of the tube acts as a swivel base, similar to the swivel base 630 of FIGS. 6 and 7. Thus, the reflector body 832 can be attached to the UV light input port 119 of FIG. 1 and allows the reflector head 834 to be rotated 360 degrees. The reflector head 834 may also be adjustable to change an angle of the reflector head 834 relative to a normal position.

Figure 10:
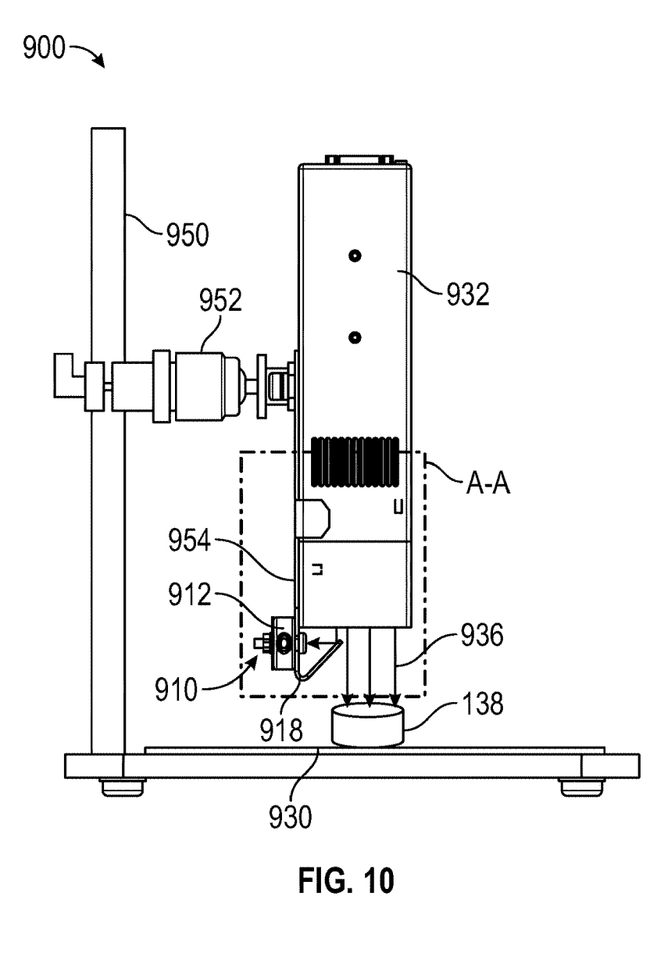
FIG. 10 depicts an example of a UV system according to some embodiments of the present invention.
Figure 11:
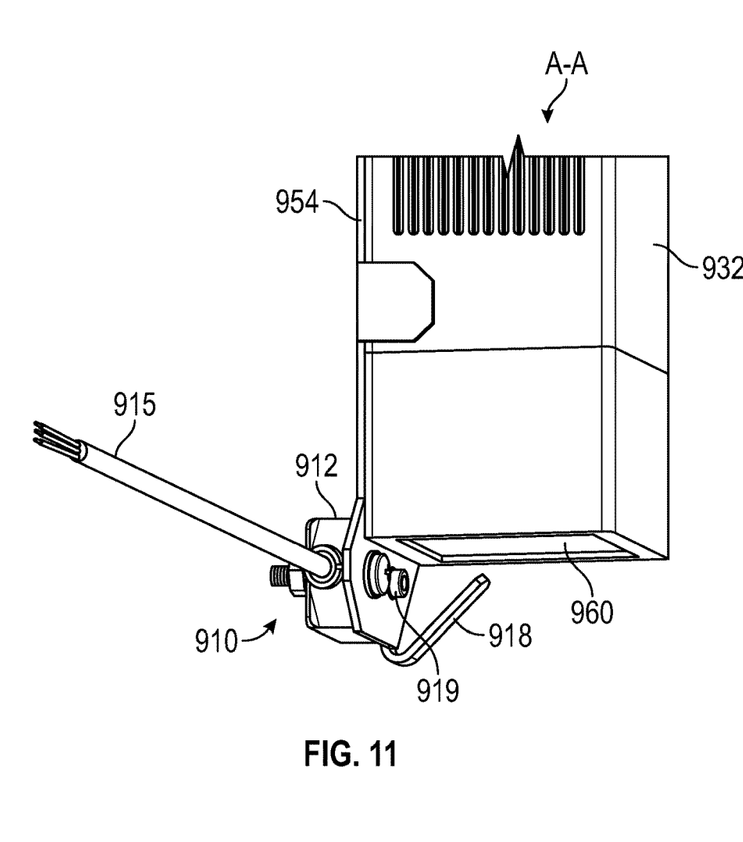
FIG. 11 depicts a portion of the UV system of FIG. 10 in greater detail according to some embodiments of the present invention.

FIG. 10 depicts an example of a UV system 900 according to an embodiment. The UV system 900 includes a UV light source 932 configured to emit UV light 936 in a UV illumination area 930. One or more workpieces 138 can be exposed to the UV light 936 in the UV illumination area 930. The UV light source 932 can be mounted to a support structure 950, for instance, using an adjustable coupling 952 that allows the UV light source 932 to be positioned at various orientations and distances from the one or more workpieces 138. The UV system 900 can also include a UV radiometer 910. The UV radiometer 910 can include a sensor controller, such as sensor controller 114 of FIG. 1, and a sensor assembly 912. A mounting bracket 954 can be connected to the UV light source 932 and provide an attachment point for the sensor assembly 912. The sensor assembly 912 can include the components of the sensor assembly 112 of FIG. 1; however, rather than a swivel mounted reflector 118, a reflector 918 can be attached to or integrally formed with the mounting bracket 954. Where the reflector 918 is integrally formed with the mounting bracket 954, the reflector 918 can be in a fixed position for more consistent long-term use as compared to a separately moveable component, such as reflector 118. In some aspects, the mounting bracket 954 can be configured to slide up or down relative to the UV light source 932 to adjust the distance of the reflector 918 from a UV emitter area 960 (best seen in portion A-A of FIG. 11) of the UV light source 932. The reflector 918 can reflect a portion of the UV light 936 into a UV light input port 919 of the sensor assembly 912, similar to UV light input port 119 of FIG. 1. A sensor link 915 can send signals to/from the sensor assembly 912, such as from/to a sensor controller (e.g., sensor controller 114 of FIG. 1). Other mounting and positioning options, as well as components, are contemplated. For example, the UV illumination area 930 can include a conveyor system to move the one or more workpieces 138 into and out of position for exposure to the UV light 936. Further, the distance between the UV emitter area 960 and UV illumination area 930 can be adjusted based on the height of the one or more workpieces 138. Further, the UV system 900 can be incorporated in a workbench, a production line machine, or partially enclosed to reduce UV exposure to non-targeted locations. As a further configuration, the reflector 918 can be a separate component and need not be coupled to the sensor assembly 912 or UV light source 932.

Figure 12:
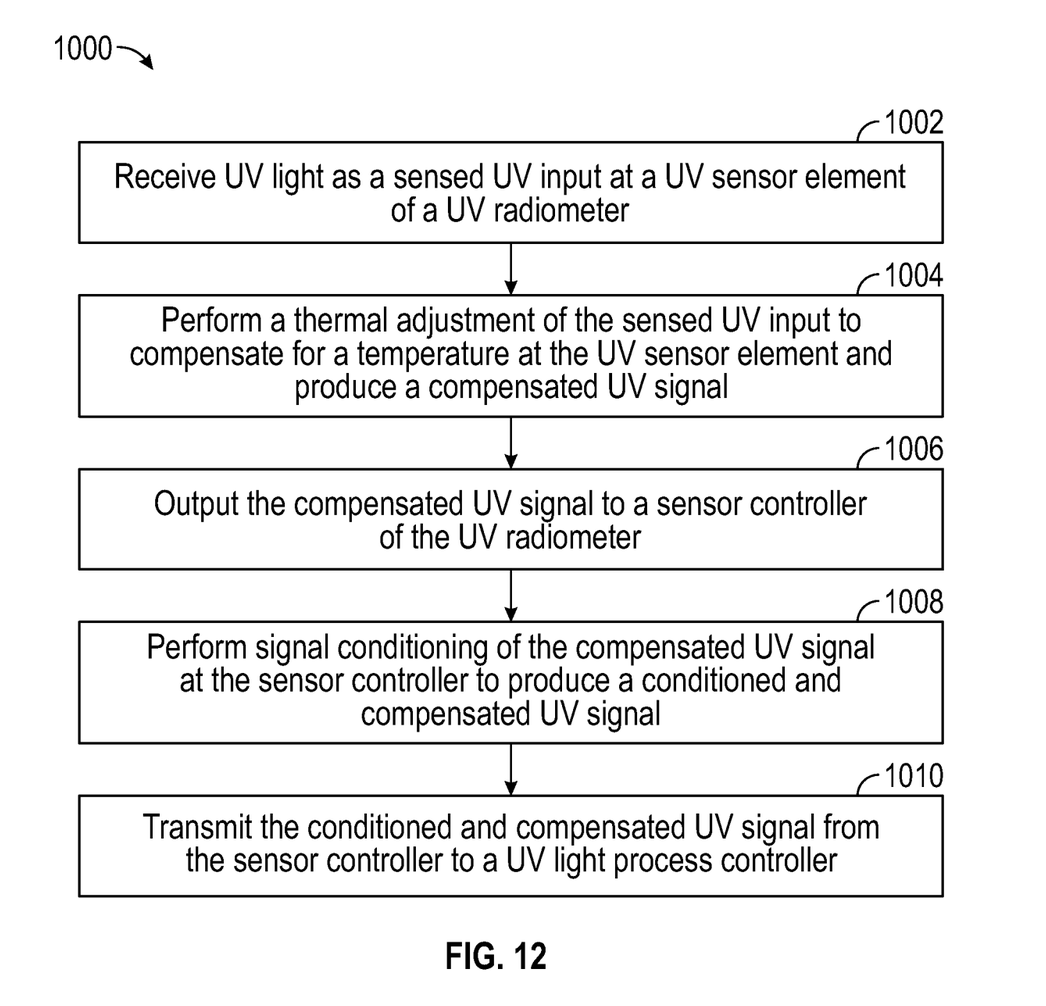
FIG. 12 depicts a process flow of a method of detecting UV light by a UV radiometer according to some embodiments of the present invention.

Turning now to FIG. 12, a process flow 1000 of a method of detecting UV light by a UV radiometer is depicted according to an embodiment. The process flow 1000 includes a number of steps that may be performed in the depicted sequence or in an alternate sequence and is described with respect to FIGS. 1-12. Further steps can be added to the process flow 1000, and steps can be combined or steps can be further subdivided. The process flow 1000 may be performed by the UV radiometer 110, 210, 310, 710 of FIGS. 1-3 and 8 or another such variation. Further, the process flow 1000 can be performed by the UV system 900 of FIG. 10. For purposes of explanation, the process flow 1000 is described primarily with respect to the UV radiometer 210.

At block 1002, UV light 136 is received as a sensed UV input at the UV sensor element 202 of the sensor assembly 212 of the UV radiometer 210. Power for the sensor assembly 212 can be provided from the sensor controller 214 to the sensor assembly 212, and power can be received at the sensor controller 214 from the UV process controller 120.

At block 1004, a thermal adjustment of the sensed UV input is performed to compensate for a temperature at the UV sensor element 202 and produce a compensated UV signal 209. Thermal adjustment can be performed using a temperature sensing component 204. A temperature compensated gain can be provided to the compensated UV signal 209 based on the temperature sensing component 204 in a feedback configuration with an amplifier 208 of the sensor assembly 212.

At block 1006, the compensated UV signal 209 is output to a sensor controller 214 of the UV radiometer 210. A comparison can be performed to detect whether the compensated UV signal 209 is above a lower threshold level and below an upper threshold level. A UV signal validation indicator 233 can be output based on a result of the comparison.

At block 1008, signal conditioning of the compensated UV signal 209 is performed at the sensor controller 214 to produce a conditioned and compensated UV signal 217. The signal conditioning can include voltage spike suppression.

At block 1010, the conditioned and compensated UV signal 217 is transmitted from the sensor controller 214 to a UV process controller 120. In some embodiments, the conditioned and compensated UV signal 217 is transmitted as an analog signal. In other embodiments, such as sensor controller 314, an analog-to-digital conversion can be performed by an analog-to-digital converter 326 of the sensor controller 314 and communication encoder/decoder 328 of the sensor controller 314 can be used to communicate with the UV process controller 120, for instance as digitized, conditioned and compensated UV signal 331.

In the context of the UV system 100, the UV process controller 120 can be configured to control exposure of one or more workpieces 138 to UV light 136 emitted by the UV light source 132 in the UV illumination area 130 based on the conditioned and compensated UV signal received from the UV radiometer 110. The UV radiometer 110 can include reflector 118 configured to swivel about a UV light input port 119 of the sensor assembly 112 proximate to the UV sensor element 202, and the reflector 118 can be adjustable to direct a portion of UV light 136 emitted from the UV light source 132 into the UV light input port 119. UV light 136 can be captured as directed by the reflector 118 at the UV light input port 119 to the UV sensor element 202. In other embodiments, reflector 918 can be mounted in a fixed position and may be integrated with a mounting bracket 954 used to position a sensor assembly 912 with respect to a UV light source 932.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via networks may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:
1. An ultraviolet (UV) radiometer comprising:
a sensor assembly comprising:
a UV sensor element; and
a temperature sensing component configured to perform a thermal adjustment of a sensed UV input from the UV sensor element to produce a compensated UV signal; and
a sensor controller comprising:
a signal conditioning circuit configured to receive the compensated UV signal from the sensor assembly and produce a conditioned and compensated UV signal; and
a communication interface configured to transmit the conditioned and compensated UV signal to a UV process controller.

2. The UV radiometer of claim 1, wherein the sensor assembly comprises a printed circuit board (PCB) having the UV sensor element on a first side of the PCB and an amplifier on a second side of the PCB, and wherein the temperature sensing component is in a feedback configuration with the amplifier to provide a temperature compensated gain to the compensated UV signal.

3. The UV radiometer of claim 1, wherein the sensor controller comprises a signal level validation circuit configured to:
perform a comparison to detect whether the compensated UV signal is above a lower threshold level and below an upper threshold level; and
output a UV signal validation indicator based on a result of the comparison.

4. The UV radiometer of claim 1, wherein the sensor controller comprises a local power supply configured to receive power from the UV process controller and provide an isolated power supply to the sensor assembly.

5. The UV radiometer of claim 1, wherein the signal conditioning circuit comprises a voltage spike suppressor.

6. The UV radiometer of claim 1, wherein the communication interface comprises an analog-to-digital converter and a communication encoder/decoder configured to communicate with the UV process controller.

7. The UV radiometer of claim 1, further comprising:
a reflector configured to reflect a portion of emitted UV light toward a UV light input port of the sensor assembly proximate to the UV sensor element.

8. An ultraviolet (UV) system comprising:
a UV light source;
a UV process controller configured to control the UV light source; and
a UV radiometer interfaced with the UV process controller, the UV radiometer comprising:
a sensor assembly comprising:
a UV sensor element; and
a temperature sensing component configured to perform a thermal adjustment of a sensed UV input from the UV sensor element to produce a compensated UV signal; and
a sensor controller comprising:
a signal conditioning circuit configured to receive the compensated UV signal from the sensor assembly and produce a conditioned and compensated UV signal; and
a communication interface configured to transmit the conditioned and compensated UV signal to the UV process controller.

9. The UV system of claim 8, wherein the sensor assembly comprises a printed circuit board (PCB) having the UV sensor element and an amplifier on the PCB, and wherein the temperature sensing component is in a feedback configuration with the amplifier to provide a temperature compensated gain to the compensated UV signal.

10. The UV system of claim 8, wherein the sensor controller comprises a signal level validation circuit configured to:
perform a comparison to detect whether the compensated UV signal is above a lower threshold level and below an upper threshold level; and
output a UV signal validation indicator based on a result of the comparison.

11. The UV system of claim 8, wherein the sensor controller comprises a local power supply configured to receive power from the UV process controller and provide an isolated power supply to the sensor assembly.

12. The UV system of claim 8, further comprising:
a UV illumination area, wherein the UV process controller is configured to control exposure of one or more workpieces to UV light emitted by the UV light source in the UV illumination area based on the conditioned and compensated UV signal received from the UV radiometer.

13. The UV system of claim 8, wherein the UV radiometer comprises a reflector configured to swivel about a UV light input port of the sensor assembly proximate to the UV sensor element, and the reflector is adjustable to direct a portion of UV light emitted from the UV light source into the UV light input port.

14. A method of detecting ultraviolet (UV) light by a UV radiometer, the method comprising:
receiving UV light as a sensed UV input at a sensor element of a sensor assembly of the UV radiometer;
performing a thermal adjustment of the sensed UV input to compensate for a temperature at the sensor element and produce a compensated UV signal;
outputting the compensated UV signal to a sensor controller of the UV radiometer;
performing signal conditioning of the compensated UV signal at the sensor controller to produce a conditioned and compensated UV signal; and
transmitting the conditioned and compensated UV signal from the sensor controller to a UV process controller.

15. The method of claim 14, wherein the sensor assembly comprises a printed circuit board (PCB) having the UV sensor element on a first side of the PCB and an amplifier on a second side of the PCB, and the method further comprises:
providing a temperature compensated gain to the compensated UV signal based on a temperature sensing component in a feedback configuration with the amplifier.

16. The method of claim 14, further comprising:
performing a comparison to detect whether the compensated UV signal is above a lower threshold level and below an upper threshold level; and
outputting a UV signal validation indicator based on a result of the comparison.

17. The method of claim 14, further comprising:
receiving power from the UV process controller at the sensor controller; and
providing an isolated power supply from the sensor controller to the sensor assembly.

18. The method of claim 14, further comprising:
performing an analog-to-digital conversion at the sensor controller; and
using a communication encoder/decoder of the sensor controller to communicate with the UV process controller.

19. The method of claim 14, further comprising:
capturing UV light directed by a reflector at a UV light input port of the sensor assembly proximate to the UV sensor element.

20. The method of claim 14, further comprising:
controlling, by the UV process controller, exposure of one or more workpieces to UV light emitted by a UV light source in a UV illumination area based on the conditioned and compensated UV signal received from the UV radiometer.

* * * * *